United States Patent
Nire

(10) Patent No.: US 6,590,964 B1
(45) Date of Patent: Jul. 8, 2003

(54) AUTOMATIC ANSWERING TELEPHONE SET

(75) Inventor: Katsuo Nire, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/021,941

(22) Filed: Feb. 11, 1998

(30) Foreign Application Priority Data

Feb. 17, 1997 (JP) .............................................. 9-031638

(51) Int. Cl.$^7$ .......................... H04M 1/64; H04M 11/00
(52) U.S. Cl. ...................... 379/67.1; 379/74; 379/88.2; 379/93.02; 379/102.01; 379/88.19
(58) Field of Search .................. 379/67.1, 47, 70, 379/88.01, 88.02, 81.74, 82.75, 88.22, 88.25, 127, 142, 105, 107, 201, 210, 88.15, 93.24, 93.35, 88.19–88.21, 81, 82, 93.02, 74, 102.01, 75

(56) References Cited

U.S. PATENT DOCUMENTS

| | | | | |
|---|---|---|---|---|
| 4,737,979 A | * | 4/1988 | Hashimoto | 379/82 |
| 4,942,598 A | * | 7/1990 | Davis | 379/57 |
| 5,394,445 A | * | 2/1995 | Ball et al. | 379/67.1 |
| 5,400,393 A | * | 3/1995 | Knuth et al. | 379/88 |
| 5,644,629 A | * | 7/1997 | Chow | 379/142 |
| 5,761,271 A | * | 6/1998 | Karnowski | 379/1 |
| 5,768,349 A | * | 6/1998 | Knuth et al. | 379/88 |
| 5,930,338 A | * | 7/1999 | McKendry et al. | 379/88.25 |

* cited by examiner

Primary Examiner—Allan Hoosain
(74) Attorney, Agent, or Firm—Jay H. Maioli

(57) ABSTRACT

An automatic answering telephone set which eliminates cumbersome operations when a user tries to listen to a recorded business message from a remote place. The automatic answering telephone set includes a termination detection section and a line interface to which a telephone line is connected commonly, a reception section connected to the line interface, a voice recording and reproduction section which provides an automatic answering telephone function, a control section formed from a microcomputer for controlling the entire automatic answering telephone set, an operation key section including several keys such as dial keys and connected to the control section, and a memory for storing a telephone number and other necessary information to be registered in advance in the automatic answering telephone set. When an originating party number notification sent from a caller ID notification service coincides with the telephone number or the like stored in the memory, a business message recorded in the automatic answering telephone number is reproduced immediately.

4 Claims, 3 Drawing Sheets

AUTOMATIC ANSWERING TELEPHONE SET

BACKGROUND OF THE INVENTION

This invention relates to an automatic answering telephone set which records a business message received from a communicating party and, when a predetermined operation is performed, reproduces the recorded business message, and more particularly to an automatic answering telephone set suitable for use when listening to a recorded business message is attempted from a remote place at which the automatic answering telephone set cannot directly be operated.

Conventionally, an automatic answering telephone set is available as a message storage apparatus for storing a message when a user cannot respond to a telephone call terminating thereat. The automatic answering telephone set allows a user to listen to a business message recorded therein from a remote place. Generally, when a user tries to listen to a business message recorded in the automatic answering telephone set from a remote place, the user will dial the automatic answering telephone set and then input, after the telephone call is terminated at the automatic answering telephone set, a password or the like to specify the user who has originated the telephone call. As a result, automatically or in response to a command inputted subsequently, the user can listen to a recorded business message.

However, in order to listen, on such an automatic answering telephone set as described above, to a recorded business message from a remote place using, for example, a portable telephone set, a personal handyphone set (PHS) or a like unit, a user must not only register a password in advance, but also perform a series of manual operations to input the stored password, which is cumbersome to the user. Further, there is the possibility that the password may be used intentionally by a third party to listen to a recorded business message, which is not desirable to the user.

SUMMARY OF THE INVENTION

It is an object of the present invention to provide an automatic answering telephone set which eliminates cumbersome operations when a user tries to listen to a recorded business message from a remote place to improve the convenience for the user.

More particularly, the present invention provides an automatic answering telephone set wherein, when a call for listening to a recorded business message is terminated at the automatic answering telephone set from an originating party, if the telephone call is originated by a user of the automatic answering telephone set from a remote place in order to listen to a business message recorded in the automatic answering telephone set, then information of a telephone number or the like sent from a caller ID notification service is utilized in place of a necessary password so that password storing and inputting operations can be eliminated.

In order to attain the object described above, according to the present invention, there is provided an automatic answering telephone set which records a business message received from an originating party and reproduces, when a predetermined operation is performed, the recorded message, comprising setting means for setting identification information of a user of the automatic answering telephone set, storage means for storing the user identification information set by the setting means, means for detecting, upon termination of a call, originating party number notification information from a signal received from a line, and control means for discriminating whether or not the detected originating party number notification information coincides with the identification information stored in the storage means and reproducing, when coincidence is detected, a business message recorded in the automatic answering telephone set.

With the automatic answering telephone set, since user identification information such as a telephone number sent from a caller ID notification service is used in place of a password, password storing and inputting operations, which are conventionally performed when it is intended to listen to a recorded business message from a remote place, can be omitted. Or in other words, a user of the automatic answering telephone set can listen to a business message recorded in the automatic answering telephone set without the necessity for any cumbersome operation such as an operation for storing a password or an operation for inputting the stored password.

Further, since a password inputting operation and so forth can be omitted, the possibility that a third party may listen to a stored business message is eliminated. Consequently, privacy protection can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

A function called caller ID (Caller ID on Call Waiting; CIDCW) is one of the functions of a telephone system. The caller ID function has been put into practical use in various countries such as the United States, Canada and the United Kingdom. The caller ID function is a method of notifying a telephone set at the call terminating side of a telephone number (line number) of a telephone set at the call originating side.

Figure 3:
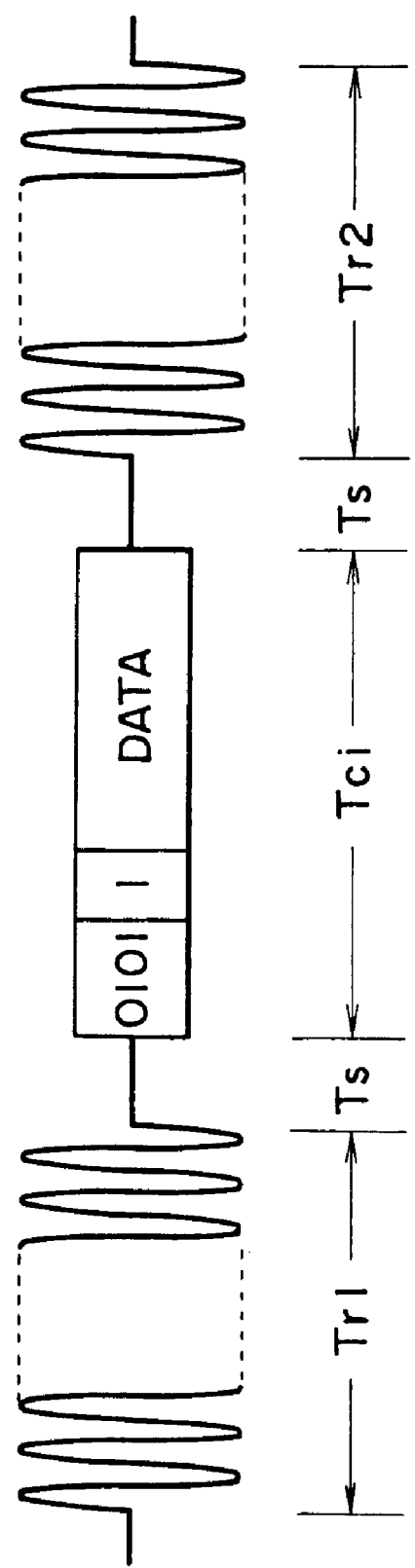
FIG. 3 is a waveform diagram illustrating a caller ID signal transmitted between different ringer signals.

In particular, when a telephone set at the call terminating side is called with a ringer signal, binary digital data (hereinafter referred to as "caller ID signal") representative of a telephone number at the call originating side is formed by a central office. The caller ID signal is sent to a telephone set at the call terminating side, for example, as seen in FIG. 3, within a period Tci between a period Tr1 of a first ringer signal and a period Tr2 of a second ringer signal.

It is to be noted that the periods Tr1 and Tr2 are, for example, 2 seconds, and a space time Ts between the periods Tr1 and Tci and between the periods Tci and Tr2 may be 0.5 seconds. Further, while the caller ID signal is a binary signal, it may be converted into an FSK signal and transmitted in the form of the FSK signal.

Accordingly, if the caller ID signal is extracted by a telephone set at the call terminating side, then the telephone set at the call originating side, that is, an originating party, can be identified from the caller ID signal.

Figure 1:
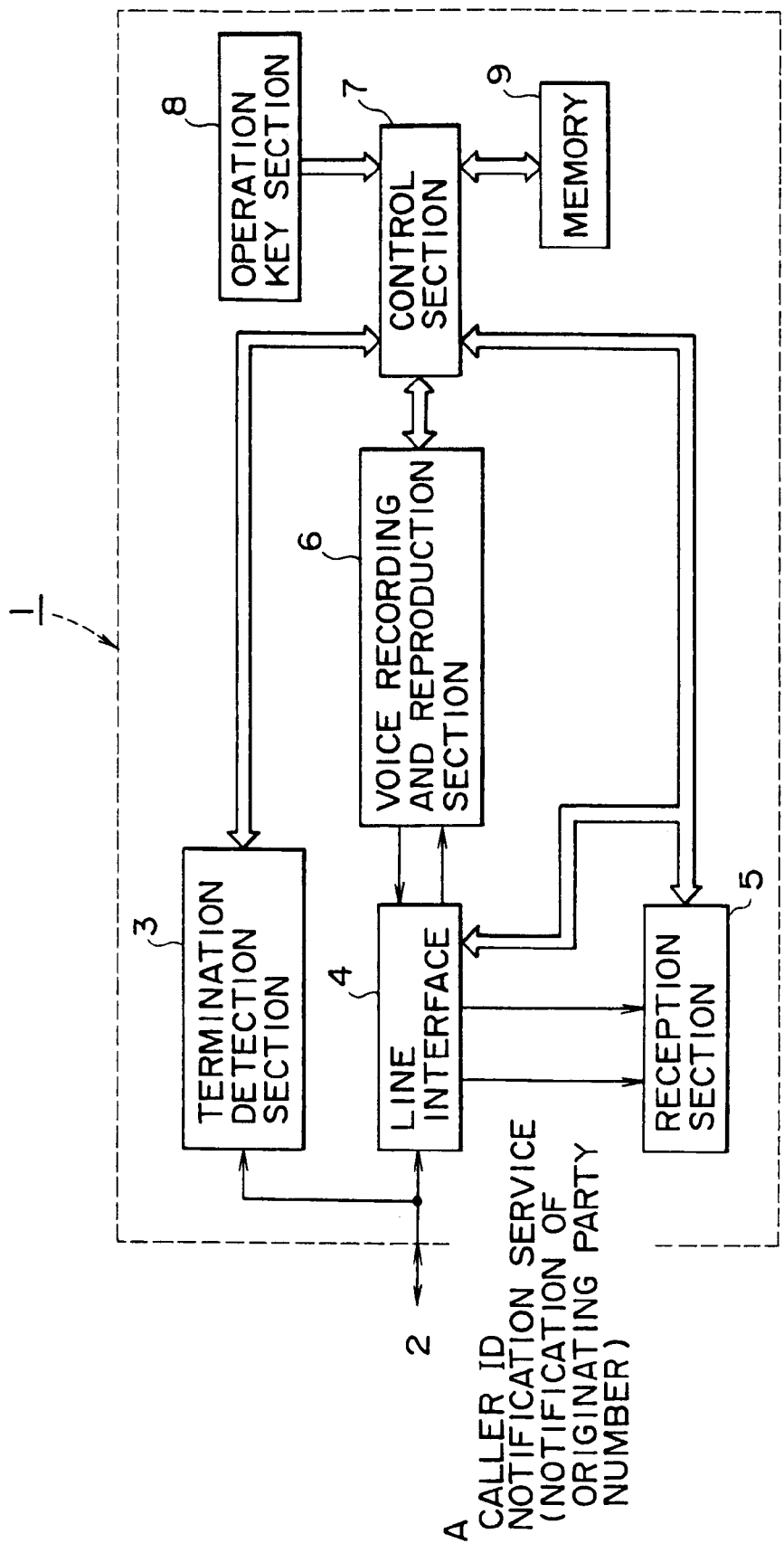
FIG. 1 is a block circuit diagram of an automatic answering telephone set to which the present invention is applied.

Referring to FIG. 1, there is shown a circuit construction of an automatic answering telephone set to which the present invention is applied. The automatic answering telephone set is generally denoted at 1 and includes a termination detection section 3 and a line interface 4 to which a telephone line 2 is connected commonly, a reception section 5 connected to the line interface 4, a voice recording and reproduction section 6 which provides an automatic answering telephone function, a control section 7 formed from a microcomputer for controlling the entire automatic answering telephone set, an operation key section 8 including several keys such as dial keys and connected to the control section 7, and a memory 9 for storing a telephone number and other necessary information to be registered in advance in the automatic answering telephone set 1.

Operation of the circuit of the automatic answering telephone set having the construction described above is described below.

First, in registration of user identification information, a user who possesses the automatic answering telephone set 1 registers a telephone number of another telephone set which may principally be utilized by the user and other necessary information into the automatic answering telephone set 1. More particularly, the user will manually operate the dial keys and so forth of the operation key section 8 to input a desired telephone number and other necessary information. The inputted telephone number and so forth are stored into the memory 9 through the control section 7, thereby completing the registration. In this instance, it is effective to use, as the telephone number to be inputted, a telephone number for individual use such as a PHS set in Japan.

In a business message recording operation of the automatic answering telephone set 1, when a call from a base station (not shown) is terminated at the automatic answering telephone set 1, the termination detection section 3 detects the termination of the call at the apparatus and generates a predetermined sound such as, for example a, beep sound to notify the user of the termination. The line interface 4 enters, if an off-hook operation by the user is not performed for several seconds, an automatic answering telephone mode, in which it notifies the originating party of a responding message stored therein to urge the originating party to send a message. If a message from the originating party is inputted, then the voice recording and reproduction section 6 starts recording the message. Then, if the communication of the message comes to an end and an on-hook operation is performed, the line interface 4 ends its condition for communication and releases the connected telephone line 2. Such a sequence of operations as described above are performed under the control of the control section 7.

In a message reproducing operation for listening to a business message recorded in the automatic answering telephone set 1 from a remote place, when a call is terminated at the automatic answering telephone set 1 from the user, the line interface 4 closes the telephone line 2 to establish a condition for communication. Thus, the reception section 5 receives an originating party number notification or the like as a caller ID notification service A from a base station through the line interface 4.

The originating party number notification or the like of the caller ID notification service A received by the reception section 5 is compared with the telephone number of the user registered in advance in the memory 9 by the control section 7. If coincidence with the telephone number is detected, then a business message or messages recorded in the automatic answering telephone set 1 are reproduced. Consequently, the user can listen to a business message or messages recorded in the automatic answering telephone set 1 without the necessity for any cumbersome operation such as an operation for storing a password or for inputting the stored password.

If the originating party number of the caller ID notification service A does not coincide with the registered telephone number, then the automatic answering telephone set 1 starts ordinary automatic answering telephone recording operation.

Figure 2:
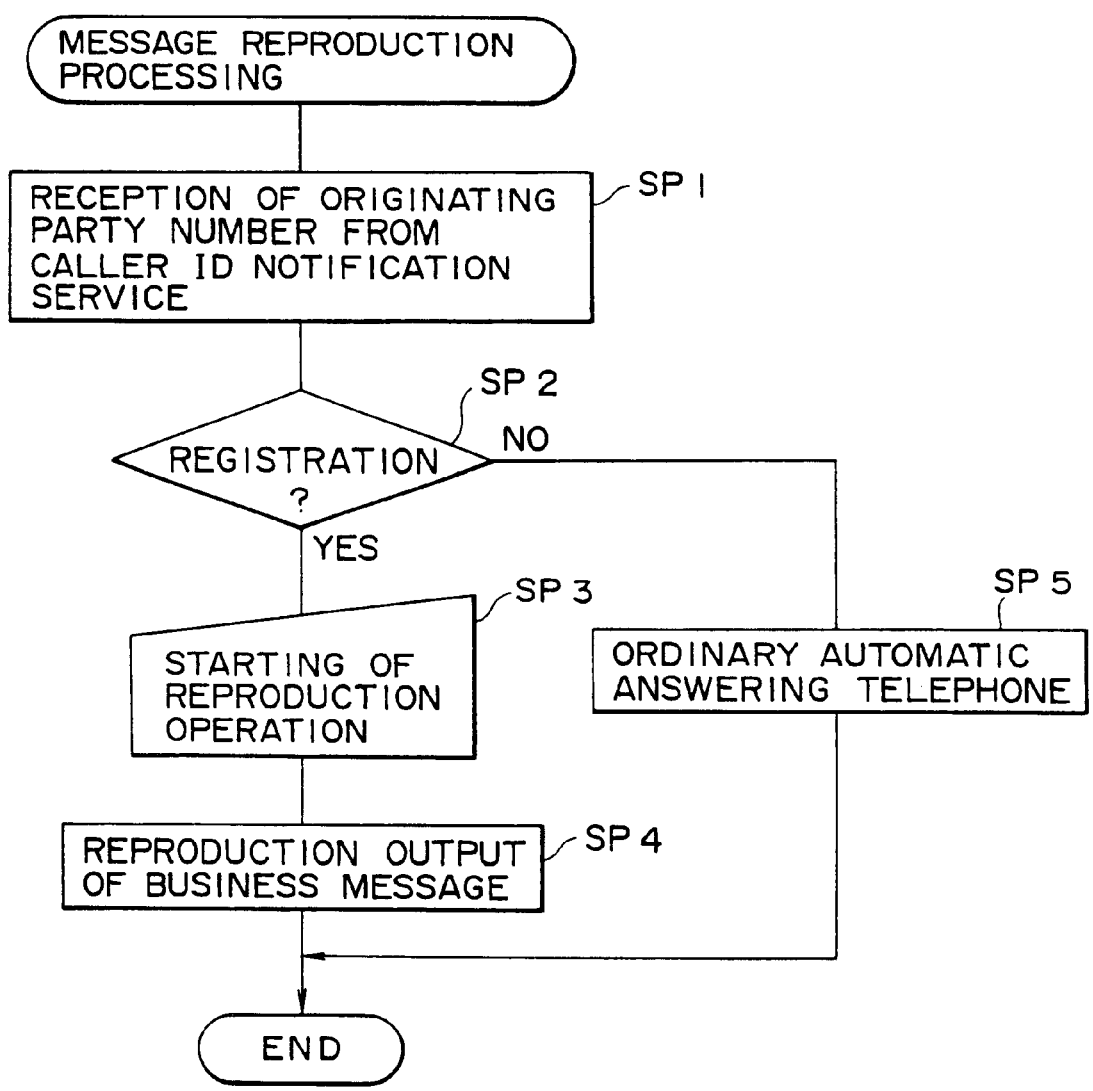
FIG. 2 is a flow chart illustrating a processing operation performed by the automatic answering telephone set for reproducing a recorded message.

Now, processing operation of the automatic answering telephone set 1 for reproducing a message is described with reference to FIG. 2.

In the automatic answering telephone set 1, a user identification number for listening to a business message is inputted by manual operation of the operation key section 8 and registered into the memory 9 in advance.

In order to listen to a business message recorded in the automatic answering telephone set 1, the user will first input the user identification number from a remote telephone set. Consequently, an originating party number notification and so forth are inputted through a base station to the reception section 5 of the automatic answering telephone set 1 by a caller ID notification service (step SP1).

Then, in step SP2, it is determined whether or not the originating party number or the like inputted by the caller ID notification service coincides with the originating party number registered in the automatic answering telephone set 1. If incoincidence is detected (NO in step SP2), then the automatic answering telephone set 1 starts an ordinary automatic answering telephone recording operation in step SP5 and then ends the message reproducing operation.

On the contrary, if it is determined in step SP2 that the originating party number or the like inputted by the caller ID notification service coincides with the originating party number registered in advance (YES in step SP2), then a reproducing operation of the automatic answering telephone set 1 is started immediately in step SP3, and a business message or messages are reproduced and outputted in step SP4, thereby ending the processing routine. Consequently, the user can listen to the business message or messages recorded in the automatic answering telephone set 1 without the necessity for any cumbersome operation such as inputting a password.

While the present invention is described above in connection with a preferred embodiment thereof, it can be embodied in various forms in addition to the embodiment described above. Further, the present invention can also be applied to automobile telephone sets, personal portable information terminals having an automatic answering telephone functions which are estimated to be developed in the future and other telephone sets irrespective of the shape or the system of the automatic answering telephone set. Further, the present invention can naturally be developed into various forms without being limited to the embodiment described above.

Having now fully described the invention, it will be apparent to one of ordinary skill in the art that many changes and modifications can be made thereto without departing from the spirit and scope of the invention as set forth herein.

What is claimed is:

1. An automatic answering telephone set for remotely retrieving a stored voice message left by a caller, comprising:

means for entering user identification information by the user in the form of a telephone number of a predetermined telephone apparatus;

first storage means for storing the telephone number of the predetermined telephone apparatus other than said automatic answering telephone set entered by the user;

second storage means for storing at least one voice message left by a caller via a telephone line;

means for transmitting and receiving signals via a telephone line to and from the user who is remotely located;

means for requesting the telephone number of an incoming call from a caller ID notification service and for receiving the requested telephone number; and control means for determining whether the received requested telephone number coincides with the user identification information of the predetermined telephone apparatus stored in said first storage means and for reproducing, when coincidence is determined, the at least one voice message stored in said second storage means and for controlling said transmitting and receiving means to transmit the at least one reproduced voice message to the user who is remotely located and is making the incoming call.

2. The automatic answering telephone set according to claim 1, wherein said control means controls said second storage means to store a message included in the received signal, when the received requested telephone number contained in the received signal does not coincide with the user identification information stored in said first storage means.

3. A method of remotely retrieving a stored voice message left by a caller comprising the steps of:

entering user identification information in the form of a telephone number of a predetermined telephone apparatus;

storing the telephone number of the predetermined telephone apparatus other than said automatic answering telephone set entered by the user;

requesting the telephone number of an incoming call from a caller ID notification service and receiving the requested telephone number;

determining whether the received requested telephone number contained in the received signal coincides with the telephone number of the predetermined telephone apparatus stored in said step of storing; and reproducing, when coincidence is determined in said step of determining, the stored voice message left by a caller and transmitting the voice message to the user who is remotely located and who is making the incoming call.

4. The method according to claim 3, wherein a message in the received signal is stored in said automatic answering telephone set when the coincidence is not detected.

* * * * *